United States Patent
Duan et al.

(10) Patent No.: US 10,200,886 B2
(45) Date of Patent: Feb. 5, 2019

(54) METHOD TO ESTIMATE AND COMPENSATE FOR NLOS BIAS IN TIME DIFFERENCE OF ARRIVAL ESTIMATE

(71) Applicant: Red Point Positioning Corporation, Brookline, MA (US)

(72) Inventors: Chunjie Duan, Brookline, MA (US); Georgiy Pekhteryev, Kharkiv (UA); Zhenzhen Ye, Groton, MA (US); Yu Zhao, Syracuse, NY (US)

(73) Assignee: RED POINT POSITIONING CORPORATION, Brookline, MA (US)

( * ) Notice: Subject to any disclaimer, the term of this patent is extended or adjusted under 35 U.S.C. 154(b) by 15 days.

(21) Appl. No.: 15/264,924

(22) Filed: Sep. 14, 2016

(65) Prior Publication Data

US 2017/0078897 A1    Mar. 16, 2017

Related U.S. Application Data

(60) Provisional application No. 62/218,070, filed on Sep. 14, 2015.

(51) Int. Cl.
*H04W 24/02* (2009.01)
*H04W 24/10* (2009.01)

(52) U.S. Cl.
CPC ......... *H04W 24/02* (2013.01); *H04W 24/10* (2013.01)

(58) Field of Classification Search
CPC .............................. H04W 24/02; H04W 24/10
See application file for complete search history.

(56) References Cited

U.S. PATENT DOCUMENTS

| 8,259,699 B2 | 9/2012 | Sahinoglu |
| 2008/0032708 A1 | 2/2008 | Guvenc et al. |
| 2010/0177681 A1 | 7/2010 | Sahinoglu |
| 2015/0156746 A1 | 6/2015 | Horne et al. |
| 2015/0185309 A1 | 7/2015 | Pu et al. |

OTHER PUBLICATIONS

International Search Report and Written Opinion for Application No. PCT/US2016/051633, dated Nov. 29, 2016 (7 pages).

*Primary Examiner* — Ronald B Abelson
(74) *Attorney, Agent, or Firm* — Nutter McClennen & Fish LLP (57) ABSTRACT

Devices, systems, and method for compensating for non-line-of-sight ("NLOS") bias in time difference of arrival ("TDOA") estimates between a first anchor and a second anchor in a network having an obstacle in the line-of-sight therebetween are provided. The systems and methods include transmitting a first packet from a first anchor; indirectly receiving the first packet by a second anchor, then transmitting a second packet by the second anchor; indirectly receiving the second packet by the first anchor; and receiving the first packet and the second packet by a mobile node. The true fly-time of the first or second packets between the first anchor and the second anchor and the bias in time of flight of the first or second packets between the first anchor and the second anchor are estimated. The time difference of arrival at the mobile device between a direct path and an indirect path is further estimated and the NLOS bias in the time difference of arrival estimated at the mobile device is corrected.

18 Claims, 8 Drawing Sheets

METHOD TO ESTIMATE AND COMPENSATE FOR NLOS BIAS IN TIME DIFFERENCE OF ARRIVAL ESTIMATE

RELATED APPLICATIONS

This application claims priority to U.S. Provisional Patent Application No. 62/218,070, filed on Sep. 14, 2015, and entitled "Method to Estimate and Compensate for NLOS Bias in Time Difference of Arrival Estimate," which patent application is hereby incorporated by reference in its entirety.

FIELD

The present disclosure relates generally to the localization systems and more particularly to methods and systems to locating objects wirelessly using time-of-flight information where there may be no line of sight between objects.

BACKGROUND

Time-of-Flight (ToF), also known as Time-of-Arrival (ToA), is often used to measure the distance between two wireless devices. The distance R can be easily calculated as fly time t multiplied by the traveling speed of the signal, i.e., R=c*t. For a radio frequency signal, c is approximately $3 \times 10^8$ m/s.

This direct conversion between time and distance is the foundation of many ToF based location estimation technologies. If the ToF is known between a device to be localized (DTBL), referred as mobile device hereinafter, and multiple devices with known locations (referred as anchors, or reference nodes hereinafter), the distances between a mobile device and anchors can be computed and subsequently the mobile location is estimated using multi-lateration, or other techniques. The localization based on ToA has been widely used in many wireless localization systems.

Given that a mobile node, or device, is generally not time-synchronized to anchors in a given network, a technique called Two-Way TOA (TW-TOA) is commonly used to estimate the location of the mobile device. TW-TOA techniques may require signals to be transmitted and received by both the anchor and the mobile device. By doing so, the round trip fly time is measured and the distance is calculated using the round trip delay as R=c*T/2, where T is the round trip fly-time. Such an implementation using TW-TOA is bandwidth and energy inefficient because of the large number of transmissions needed for each localization operation. A system using TW-TOA for localization operations often has a significant capacity limit, i.e., the total number of nodes, or updates are very limited.

A more efficient technique for localization than TW-TOA is based on measuring the Time-Difference-of-Arrival (TDOA). TDOA estimates the differences in the distance from the mobile device to a plurality of different anchors. The differences in distance are calculated by measuring the difference of time when signals arrive at each receiver anchor, which subsequently determines the flight time difference. There are a number of methods to realize TDOA-based locationing, such as downlink TDOA (DL-TDOA), such as the TDOA system described in U.S. Patent Application Publication No. 2015/0156746, 'Method and System for Estimating the Location of a Receiving Device,' hereby incorporated by reference, uplink TDOA (UL-TDOA), such as the UL-TDOA system described in US Patent Application Publication No. 2015/0185309, 'Method and System for Estimating the Location of a Transmitting Device In a Wireless Network,' hereby incorporated by reference, and Beacon synchronized TDOA (BS-TDOA). The present disclosure describes techniques to improve the performance of the TDOA systems and can be applicable to all TDOA schemes.

Figure 2A:
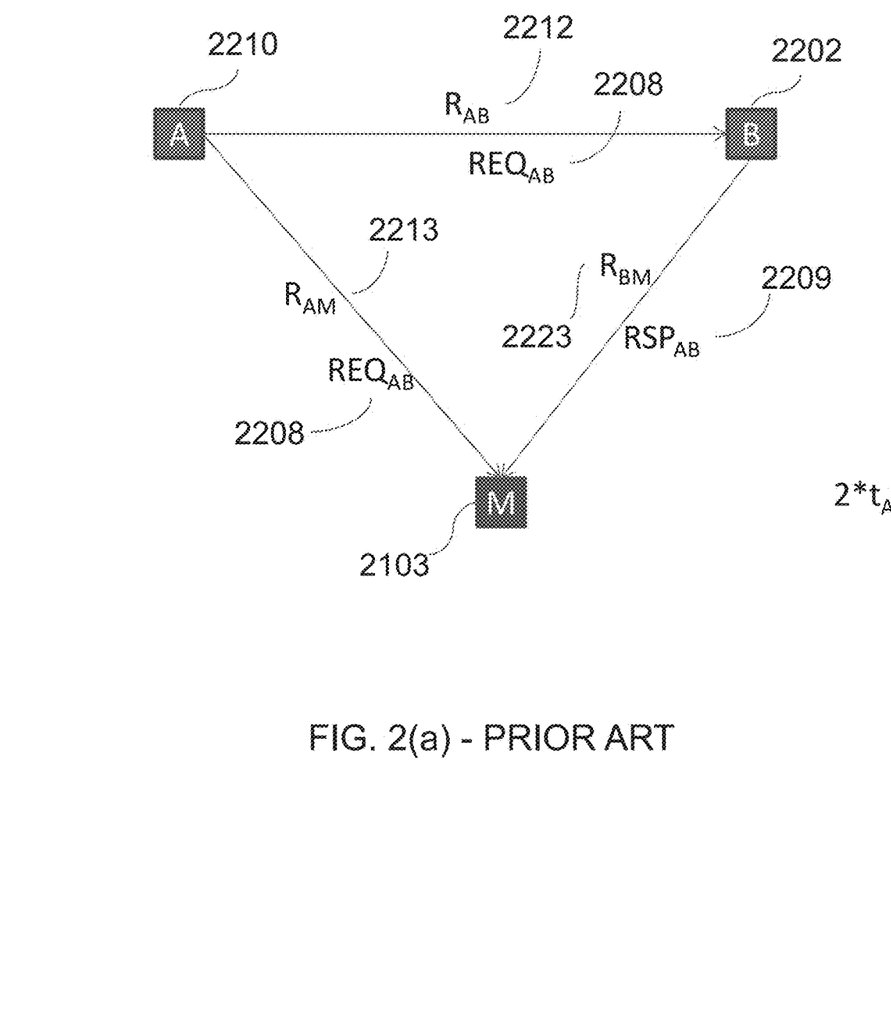
FIG. 2(a) shows a prior art of a schematic of transmission and reception of wireless signals.
Figure 2B:
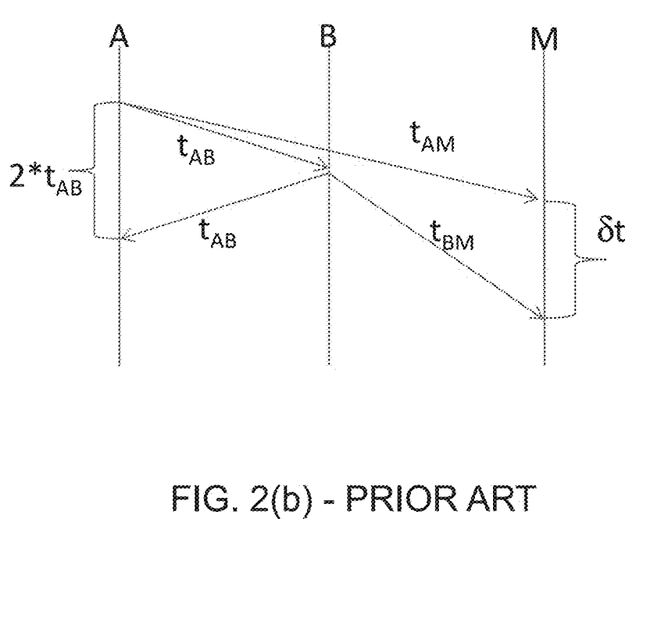
FIG. 2(b) shows a prior art timing diagram of the transmission and reception of the wireless signals.

A DL-TDOA system is illustrated in FIGS. 2(a) and 2(b). At the start of a positioning ranging process, an anchor 2210 can transmit a first request (REQ) packet 2208. One or more anchors 2202 can respond to the REQ packet 2208 by each transmitting response (RSP) packets 2209. A RSP packet 2209 may only be transmitted by an anchor 2202 after it receives a REQ packet 2208. A mobile device 2103 can receive both the REQ and the RSP packets 2208, 2209, and can thereby determine time differences of arrival and thereby estimate its own position.

Figure 7:
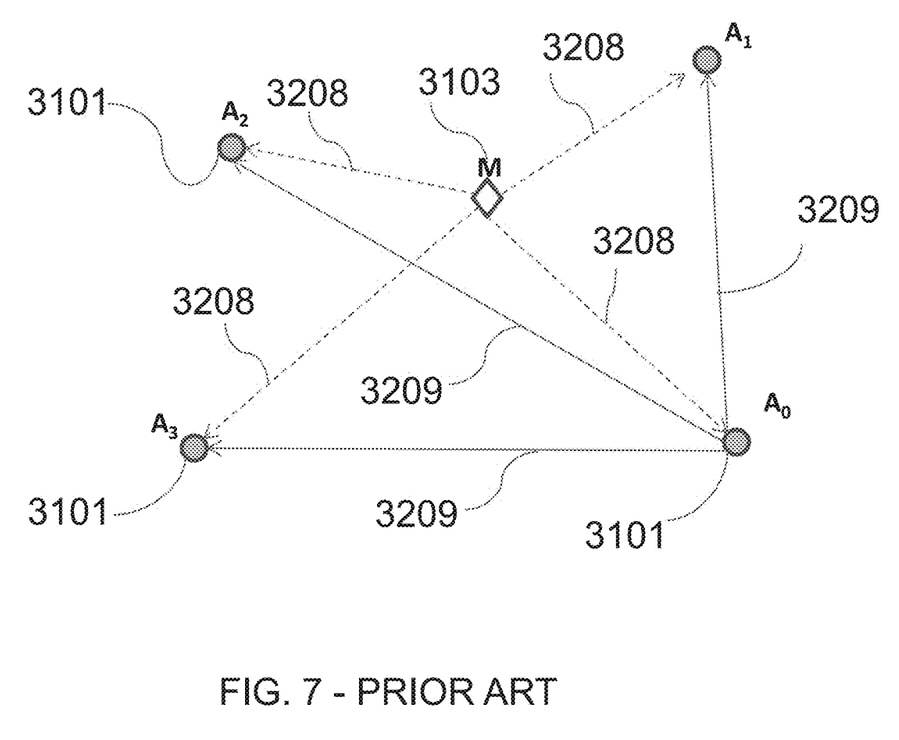
FIG. 7 is a schematic of a prior art UL-TDOA scheme.

A UL-TDOA system is illustrated in FIG. 7. The UL-TDOA system can include at least one mobile device 3101 and a plurality of anchors 3101. At the start of a localization process, a mobile device, M 3103, can transmit a REQ packet 3208. One of the anchors in range, for example anchor a0 3101 can responds to REQ packet 3208 by transmitting a RSP packet 3209. Other anchors in range, for example anchors a1-a3 3101, can each receive both REQ 3208 and RSP 3209 packets to determine the time differences of arrival. The location of the mobile device M 3103 can thus be estimated, as described in greater detail in U.S. Patent Application Publication No. 2015/0185309, 'Method and System for Estimating the Location of a Transmitting Device In a Wireless Network.'

Figure 8:
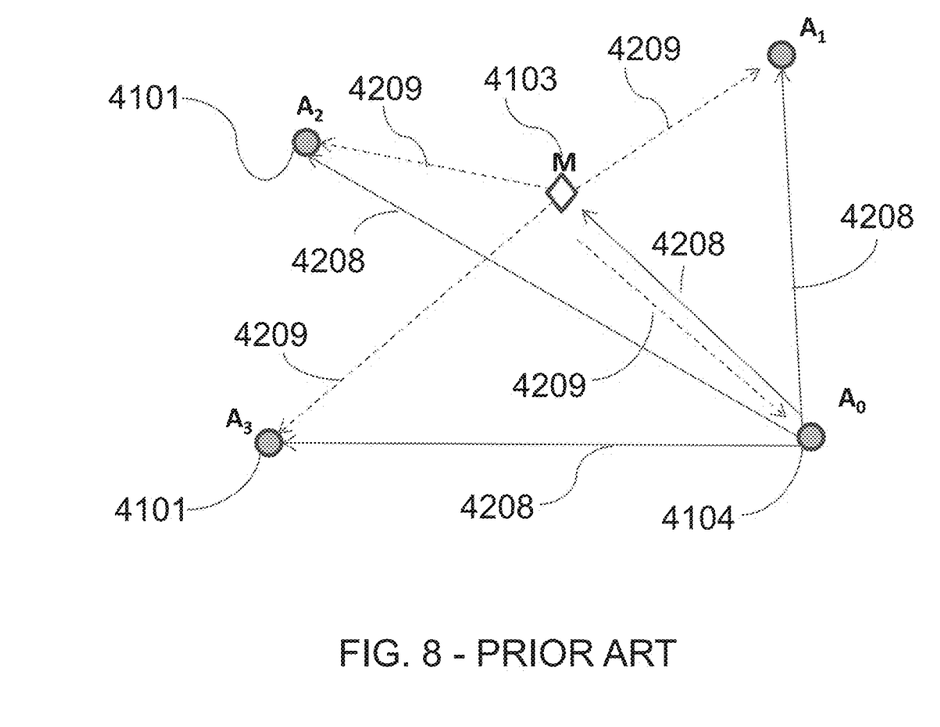
FIG. 8 is a schematic of a prior art BS-TDOA system

Another scheme using a hybrid TW-ToA and TDOA, referred to herein as Beacon Synchronized TDOA (BS-TDOA) scheme is illustrated in FIG. 8. The BS-TDOA system can include at least one mobile device M 4103 and a plurality of anchors 4101, 4104. At the start of the process, one of the anchors, for example a0 4104, can transmit a REQ packet 4208. The mobile device, for example M 4103 can, after receiving REQ packet 4208, transmit a response packet RSP 4209. RSP packet 4209 can be received by all anchors 4101. Anchors 4101 can determine the time differences between when each RSP packet 209 is received. The location of the mobile device 4103 can then be estimated using the arrival time difference, as described in greater detail in U.S. Pat. No. 8,259,699, 'Method and system for target positioning and tracking in cooperative relay networks,' hereby incorporated by reference in its entirety.

In all three TDOA schemes described above, two types of packets are transmitted, a request (REQ) packet, and one or more response (RSP) packets. A RSP packet is only transmitted by a device only after it receives a REQ packet. The difference lies in the devices used to transmit these packets and to measure the time difference of the arrivals.

In DL-TDOA, an REQ is sent by an anchor, and an RSP is sent by another anchor. The time differences of arrival are measured by a mobile.

In UL-TDOA, an REQ is sent by a mobile, and one, or more RSP packets are sent by anchors. The time differences of arrival are measured by anchors.

In BS-TDOA, an REQ is sent by an anchor, and an RSP is sent by a mobile. The time differences of arrival are measured by anchors.

For current ToA and TDOA localization schemes, the accuracy of the location estimate will be affected by the presence of the non-line of sight (NLOS) measurements. In aforementioned cases, the NLOS measurements can introduce a time delay bias between anchor and mobile that is a factor that needs to be mitigated. Additionally, mobile nodes are often moving within an area covered by a system. As mobile devices are moving through a system, it is often not possible to avoid the occurrence of NLOS measurements, though the bias is not always consistent as the mobile device moves into a more favorable location, the bias will disappear. For TDOA systems, the NLOS bias between anchor nodes can additionally have the same effect on accuracy in location determinations. The bias between anchors, however, is persistent as anchors are fixed and thus do not change locations.

In all three cases described above, the time of flight between anchors is used to estimate the position of mobile devices. Accurate measurements of time of flight is necessary is for obtaining accurate position estimates for the mobile devices.

The bias caused by NLOS packet transmissions can severely degrade the accuracy of the position estimate of the mobile device. The bias between anchors can be especially harmful as the bias is always present for all the mobile devices. The bias can negatively impact position estimates of all individual mobile devices using the anchors not within the line of sight of each other.

To avoid the problems associated with non-line-of-sight bias, it is common practice to carefully choose only the anchor pairs that are within Line-of-Sight (LOS) to each other as TDOA pairs. This, however, can sometimes be difficult to realize, especially in complicated indoor environments. Even in systems where it is possible to carefully chose anchor pairs within LOS, it may require increasing the total number of anchors needed for the coverage, or may significantly reduce the overall network efficiency. LOS systems may also require time-consuming, manual pairing, which can indirectly increase the installation complexity and cost.

Accordingly, a need exists for systems and methods that allow for a reduction in non-line-of-sight signal transmission bias to enhance position estimates for mobile devices.

SUMMARY

Systems, devices, and methods are generally provided for performing location estimates of mobile nodes. More specifically, the systems, devices, and methods are designed to compensate for systems where there is limited, or no-line-of-sight between anchor nodes, or between anchor nodes and a mobile node. In one exemplary method for compensating for non-line-of-sight ("NLOS") bias in time difference of arrival ("TDOA") estimate between a first anchor and a second anchor in a network having an obstacle in the line-of-sight therebetween, the method includes transmitting a first packet from a first anchor and indirectly receiving the first packet by a second anchor. Then the second anchor transmits a second packet and the first anchors indirectly receives the second packet. A mobile node receives both the first packet and the second packet. The true fly-time of the first or second packets between the first anchor and the second anchor is estimated. Further, the bias in time of flight of the first or second packets between the first anchor and the second anchor is estimated. The time difference of arrival at the mobile device between a direct path and an indirect path is estimated and the NLOS bias in the time difference of arrival is corrected at the mobile device.

In some embodiments the estimating and correcting can be performed by the first and second anchors. In some other embodiments, estimating of the fly-time can be performed by a first anchor. Further, in some embodiments, the mobile device can perform the correcting NLOS bias in the time difference of arrival. In some embodiments, the estimated bias can be filtered. The true locations of the first anchor and the second anchor can be known. The estimated bias can be embedded in a packet and transmitted.

In some embodiments the bias between the first and second anchors can be compensated, according to: $\Delta R_{AB} = t_{AB} \ast c - R_{AB} = \Delta t^A/2 \ast c - R_{AB}$. Where $t_{AB}$ can be the time of travel of the first packet from the first anchor to the second anchor, and $R_{AB}$ can be the direct path between the first and second anchors. The estimated bias between anchors can be used directly in estimating a corrected distance difference, according to: $\Delta R^C{}_{AB} = \Delta R^M{}_{AB} - \Delta R_{AB}$. Where $\Delta R^M{}_{AB}$ is the original distance difference measured at the mobile device.

In other embodiments, the true fly-time between the first and second anchor cam be embedded in a first packet and transmitted. The true locations of one or both of the first and second anchors can be unknown. The NLOS bias between the first and second anchors can be estimated and updated a plurality of times. The NLOS bias between the first and second anchors can be estimated during the initial setup of the network. In some embodiments the method can further include estimating the position of the mobile device in an external computing device.

In another exemplary method for compensating for non-line-of-sight ("NLOS") bias a time difference of arrival estimate, using an uplink time difference of arrival ("UL-TDOA") scheme, the method includes transmitting a first packet by a mobile device; receiving the first packet by at least one first anchor and then transmitting a second packet by the at least one first anchor. The first packet and the second packet are received by at least one second anchor in range of the mobile device and at least one first anchor. Estimating the time differences of arrival at the at least one second anchor and correcting the time differences of arrival at the at least one second anchor by subtracting the NLOS bias between the at least one first anchor and at least one second anchor.

In some embodiments the method can include estimating the position of the mobile device using the corrected time differences of arrival. Estimating the position of the mobile device can be done in an external computing device.

In a further exemplary method to compensate for the non-line-of-sight ("NLOS") bias, using a beacon synchronized time difference of arrival ("BS-TDOA") estimate, the method includes transmitting a first packet by a first anchor, receiving the first packet by a mobile node and then transmitting a second packet by the mobile node. The first packet and the second packet are received by at least one second anchor that is within range of the first anchor and the mobile node. Measuring the time differences of arrival between a direct packet transmission path and an indirect packet transmission path by the at least one second node and correcting the time differences of arrival with an estimated bias of fly-time between the first anchor and at least one second anchor.

In some embodiments the method can include estimating the position of the mobile device using the corrected time differences of arrival. Estimating the position of the mobile device can be done in an external computing device.

BRIEF DESCRIPTION OF THE DRAWINGS

The following detailed description is provided with the accompanying drawings, in which.

DETAILED DESCRIPTION

This present disclosure describes systems and methods to automatically estimate the fly-time bias for anchor pairs and compensate for it during the position estimate process. As a result, the system can deploy a TDOA network with anchors installed in arbitrary locations and without having to worry about introducing bias from non-line-of-sight packet transmissions. According to the present disclosure and two anchors within range of each other can be used as a TDOA pair. The present disclosure can significantly simplify the network planning process as it allows the network to be planned manually and at the same time reduces the total number of anchor devices, increases the location coverage, and offers more accurate position services.

Figure 1:
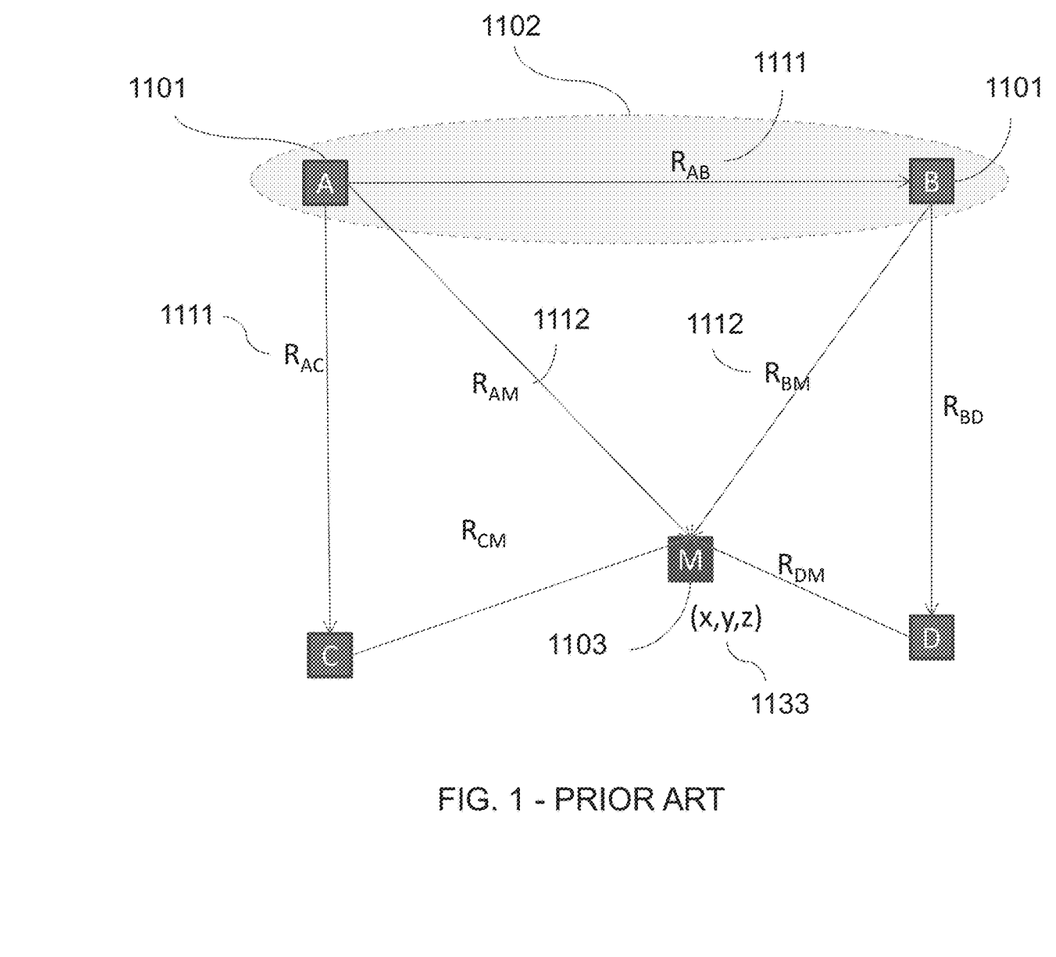
FIG. 1 is a prior art schematic of localization network based on a downlink TDOA scheme.

FIG. 1 illustrates a prior art Time-of-Flight (TOF) based locationing system 1100 which consists of a number of anchor devices 1101 and mobile devices 1103. In a DL-TDOA configuration, as described in U.S. Patent Application Publication No. 2015/0156746, which is hereby incorporated by reference, anchor nodes are grouped in pairs (e.g., anchor pairs 1102). Each pair 1102 consists of two anchors 1101 that are within each other's range. For example, anchors A and B form a pair 1102. Further, anchors A, B, C, and D can additionally be paired into the following pairs {B,D}, {C,D}, {C,A}, {B,C} and {A,D} if those nodes are within each other's range. For TDOA location operation, all, or some of the anchor pairs can transmit using RF signals 1112. Alternatively, the present disclosure contemplates that additional signal types can be used without departing from the spirit of the present disclosure. The RF signals 1112 are received by the mobile devices 1103. The reception time of the signals 1112 are estimated and used to determine the distance difference from the mobile to anchors respectively. With the distance differences, and the anchor locations known, the position of the mobile device 1133 can be estimated.

The present application assumes that signals transmitted by radio devices are in the form of packets. Moreover, the anchors, radio nodes, and mobile devices can be Ultra-Wideband (UWB) radio devices. Alternatively, it is understood that other signal formats can be used as long as timing information can be extracted. The mobile devices, anchors, and other nodes can be formed together as a single network.

During a downlink TDOA (DL-TDOA) operation, each anchor 2201, 2202 in an anchor pair {A, B} can transmit one packet. FIG. 2(a) illustrates two anchors 2201, 2202 and one mobile device 2103 in the DL-TDOA operation. The first anchor 2201 can transmit an REQ packet 2208. The second anchor 2202 can receive the REQ packet 2208 and then can transmit an RSP packet 2209 immediately, or after a brief delay. A mobile node, or mobile device, 2103 can receive both the REQ packet 2208 and the RSP packet 2209. The mobile node can then measure the time delay between the reception of REQ ($t^M_{REQ}$) and RSP ($t^M_{RSP}$), $\Delta t = t^M_{RSP} - t^M_{REQ}$.

The time-of-flight of the signals are illustrated in FIGS. 2(a) and 2(b). The REQ packet 2208 travels by distance $R_{AM}$ 2213 to reach a mobile device 2103. The REQ packet 2208 additionally travels by distance $R_{AB}$ 2212 to reach anchor B 2202. Upon receiving REQ packet 2208, anchor B 2202 transmits a packet RSP 2209. The transmitted signal RSP 2209 travels by distance $R_{BM}$ 2223 to reach the mobile device 2103. The path from anchor A 2201 to mobile M 2103 is defined as the 'direct path', and the path from anchor A 2201 to mobile M 2103 via a second anchor 2202 (e.g., anchor B) as the 'indirect path'. The distance difference between the direct path and indirect path is $\Delta R = (R_{AB} + R_{BM}) - R_{AM}$. The distance difference from the mobile device 2103 to different anchors, e.g., $\Delta R^M_{AB} = R_{BM} - R_{AM}$, can be used to estimate the position of the mobile device. The distance difference is estimated as follows:

$$\Delta R^M_{AB} = R_{BM} - R_{AM} = (R_{AB} + R_{BM}) - R_{AM} - R_{AB} = \Delta t * c - R_{AB} \quad (1)$$

where $\Delta t$ (time difference of arrival) is the time elapsed from reception of REQ 2208 to the reception of RSP 2209 measured by the mobile device node M 2103; $R_{AB}$, and $\Delta t$ can be computed based on the known locations of anchor A and B. In case the turnaround time at the second anchor device 2202 is non-zero, it is subtracted from the measured time difference as well.

FIG. 2(b) shows the timing diagram of the packets. Where $t_{AM}$ is the fly-time of signal from anchor A 2201 to mobile device M 2103 directly (A→M), and where $t_{AB}$, $t_{BM}$ are the fly-times of the signals via the indirect path (A→B→M). Again for simplicity, the turnaround time is assumed to be zero.

Figures 3A, 3B:
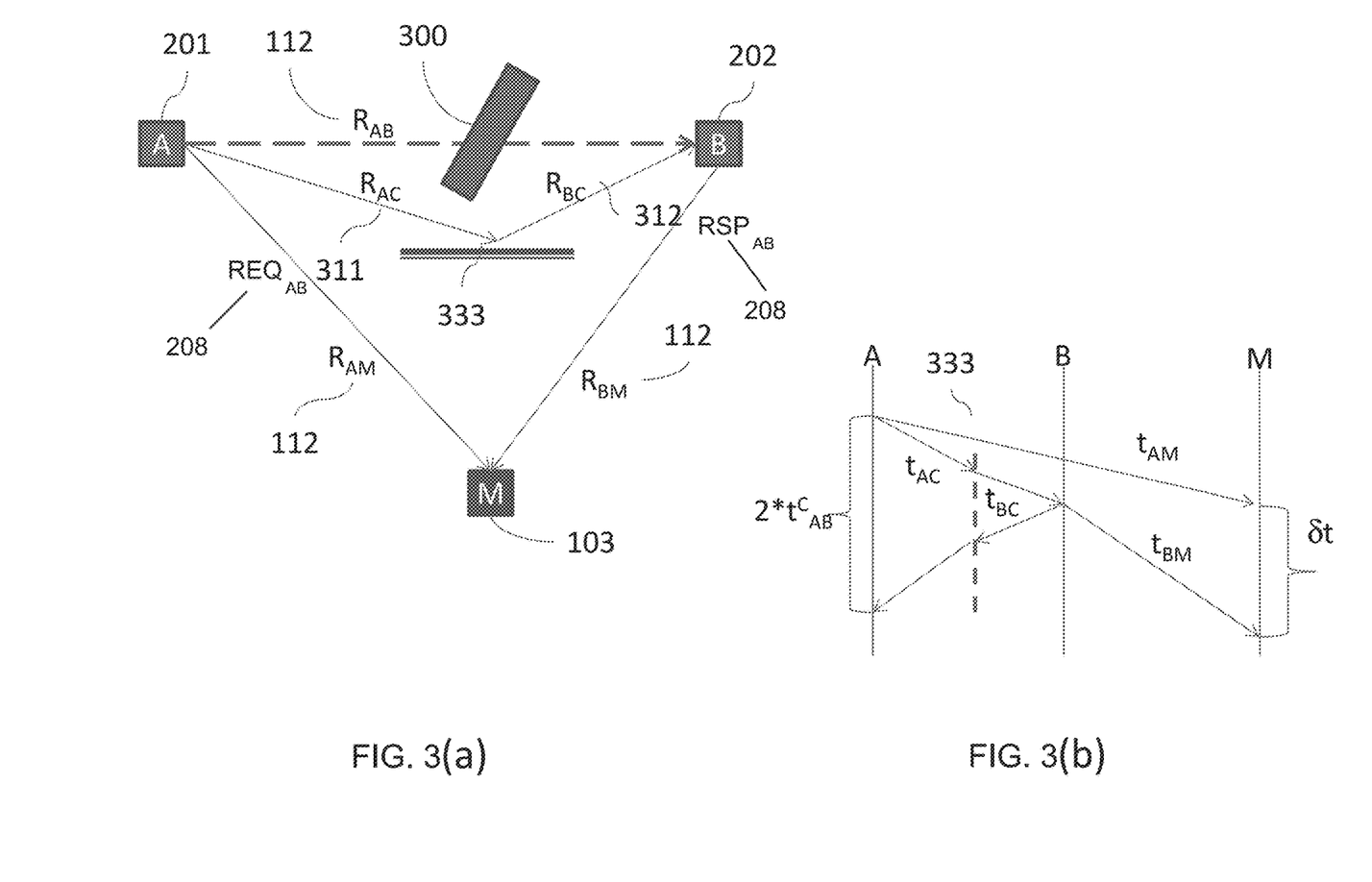
FIG. 3(a) illustrates signal transmissions with NLOS path between anchors in a DL-TDOA scheme.
FIG. 3(b) illustrates the timing with NLOS path between anchors in a DL-TDOA transmission.

Equation (1) can be used to accurately estimate the distance difference $\Delta R^M_{AB}$. However, as shown in FIG. 3(a) a bias can be present in the location estimate when the anchors 201, 202 are not in line-of-sight (LOS) from each other. In the case where the LOS path $R_{AB}$ 112 between anchor A 201 and anchor B 202 is not available, the signal may reach anchor B 202 via a non-line-of-sight (NLOS) path. As shown in FIG. 3, the NLOS path consists of two segments $R_{AC}$ 311 and $R_{BC}$ 312 between anchors and a reflector 333 due to the presence of a physical obstacle 300. Obstacle 300 can be, for example, any of a wall, a display, goods, etc. The total travel distance of the signal is greater than the direct LOS path, i.e., $R_{AC} + R_{BC} > R_{AB}$. As a result, the overall travel from the indirect path has a positive bias $\Delta R_{AB} = R_{AC} + R_{BC} - R_{AB}$. This is reflected as a positive bias in the measured time difference of arrival (TDOA).

In the above discussed NLOS situation, if equation (1) is used directly, this bias $\Delta R_{AB}$ will be included in the overall time difference measurement $\Delta t$, and as a result, the position estimate can be significantly degraded. Estimating the bias $\Delta R_{AB}$ and compensating for it can therefore improve the position estimate accuracy.

FIG. 3(b) shows the timing diagram of the packet transmission and reception at the anchors 201, 202 and the mobile device 103. FIG. 3(b) additionally illustrates how to estimate the bias $\Delta R_{AB}$. For example, the sequence of packet transmissions is unchanged, i.e., the first anchor A 201 transmits a REQ packet 208, the second anchor 202 receives the first REQ packet 208. The second anchor then transmits a RSP packet 209. The mobile device 103 receives the REQ packet 208, from anchor A 201, and the RSP packet 209, from anchor B 202. The mobile device 103 can then measure the difference between the direct path, and the indirect path via the second anchor 202.

To estimate the bias, the first anchor 201 measures the time elapsed between the transmission of the REQ packet to the reception of the RSP packet. The first anchor 201 can estimate the round trip fly-time of the signal via the NLOS path, as $\Delta t^A = 2 * t_{AB}$. The fly-time from anchor A 201 to anchor B 202 is $t_{AB} = \Delta t^A/2$. The distance bias is then computed as $$\Delta R_{AB} = t_{AB} * c - R_{AB} = \Delta t^A / 2 * c - R_{AB} \quad (2)$$

Once the estimated bias $\Delta R_{AB}$ is calculated, anchor A 201 can broadcast this information. The estimated bias can be embedded into the following REQ packet sent by the anchor A 201. Assuming that anchors 201, 202 are stationary and their locations do not change over time, the bias between an anchor pair does not change. The anchors 201, 202 can improve the accuracy of the bias estimate by applying filtering to the estimated bias. The bias between anchor pairs {A, B} can be measured continuously, or during the initial network setup. Each anchor 201, 202 can store the bias estimates of its neighboring anchors. The estimated bias, when available, can be included in the REQ or RSP packets 208, 209.

The mobile node, after receiving the bias $\Delta R_{AB}$, corrects the original TDOA measurement with the bias, as follows $$\Delta R^C_{AB} = \Delta R^M_{AB} - \Delta R_{AB} \quad (3)$$

As we can see, $\Delta R^C_{AB} = \Delta R^M_{AB} - \Delta R_{AB} = \Delta t * c - (R_{AB} + \Delta R_{AB})$. Equation (3) can be rewritten as $$\Delta R^M_{AB} = (\Delta t - \Delta t^A/2) * c \quad (4)$$

Equation (4) expresses the relationship that the distance difference can be estimated using the measured time difference of arrival at a mobile device, and the measured flight time between anchors. It is not necessary to know the anchor locations to solve for the distance difference.

Figure 4A:
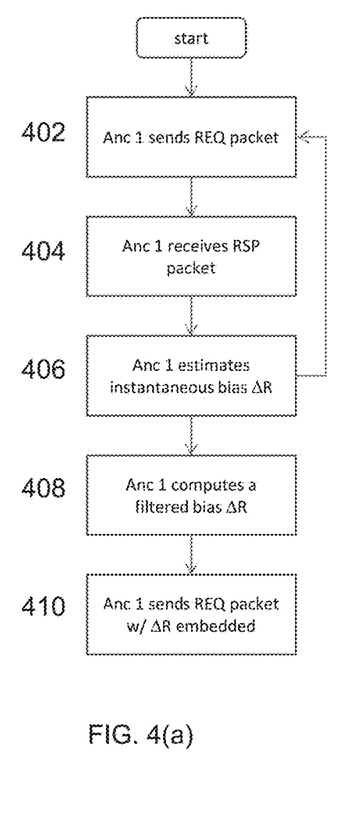
FIGS. 4(a)-(c) are the flow charts illustrating anchors and mobile device for a TDOA location operation.
Figure 4B:
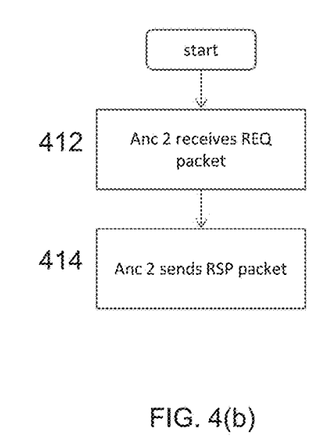
Figure 4C:
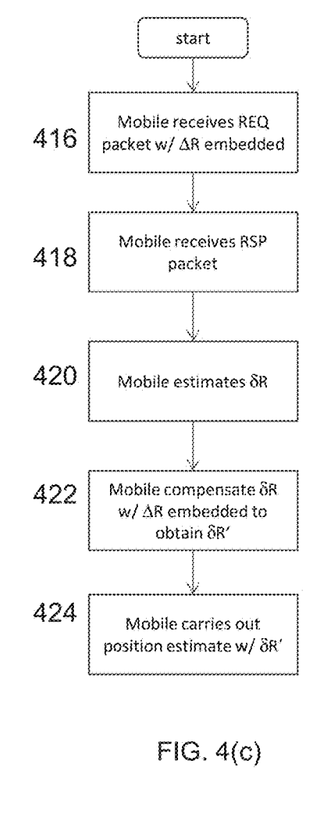

FIGS. 4(a)-4(c) illustrate flow diagrams describing the DL-TDOA scheme from the first anchor (initiating anchor), the second anchor (responding anchor) and the mobile device. The flow for each of the nodes, e.g. anchor A, anchor B, and the mobile device, can be summarized as follows:

Initiating anchor (anchor A)
  transmits REQ packet 402,
  receives RSP packet 404,
  estimates the round trip delay $\Delta t^A$ and computes the distance bias ARAB 406,
  processing the bias estimate 408, and
  broadcasts the bias (e.g., in the following REQ packet) 410.
Responding anchor (anchor B)
  receives REQ packet 412 and
  transmits RSP packet 414.
Mobile node (mobile device)
  receives REQ and RSP packets 416,
  receives anchor bias $\Delta R$ or fly-time $\Delta t^A$ 418,
  measures fly-time difference. At between the direct path and indirect path 420,
  correct the estimated fly-time difference with the anchor bias $\Delta R$ 422, and
  estimates position using corrected distance differences for multiple anchor pairs 424.

Figure 5:
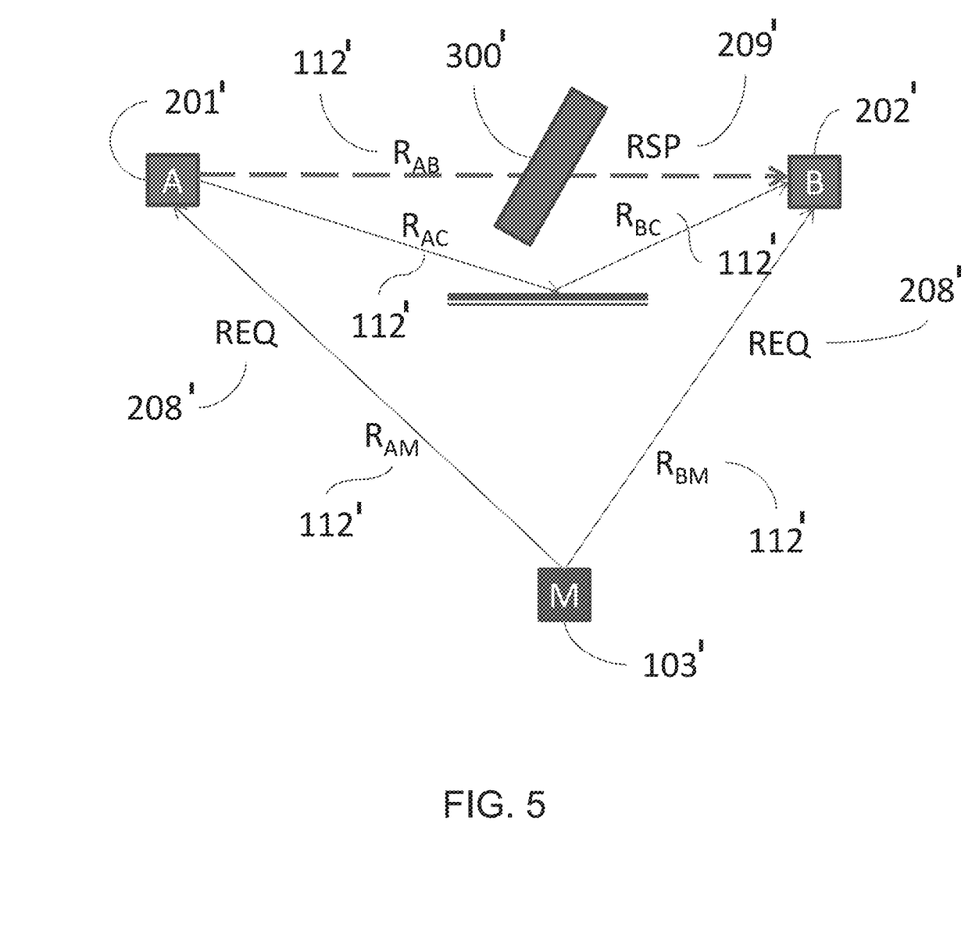
FIG. 5 is a schematic of a bias compensation for network based on uplink TDOA scheme.

The above described methods are applicable for other TDOA schemes. Except as described below, or as will be readily appreciated by one having ordinary skill in the art, the anchors 201', 202', the mobile device 103', and the physical obstacle 300' are substantially similar to the anchors 201, 202, mobile device 103, and the physical obstacle 300 described above. A detailed description of the structure and function thereof is thus omitted here for the sake of brevity. For example, in the case of UL-TDOA, a mobile device 103' can transmit a REQ packet 208' to all anchors within range of the mobile device 103'. One or more of the anchors, e.g. 201', 202', upon receiving the REQ packet 208', can transmit RSP packets 209'. Anchors 201', 202' receive the RSP packets 209'. FIG. 5 illustrates the signal path and packet transmission between the two anchors A and B and a mobile device 103' during the UL-TDOA operation. As shown, mobile device 103 initially transmits a REQ packet 208'; then anchor A 201 receives the REQ packet 208'. Once anchor A 208' receives the REQ packet 208', anchor A 208' can then transmit a RSP packet 209'. Subsequently, anchor B 202 can receive both the REQ and RSP packets 208, 209. As shown in FIG. 5, a physical obstacle 300' between at least anchors A and B 201, 202, that creates an NLOS bias between the anchors. The distance difference between the mobile device 103' to the two anchors 201', 202' is calculated as $$\Delta R^M_{AB} = R_{BM} - R_{AM} = R_{BM} - (R_{AM} + R_{AB}) + R_{AB} = \Delta t * c + R_{AB} \quad (5)$$

where $\Delta t$ is the measured time elapsed from the reception of REQ packet 208' to the reception of RSP packet 208' at anchor B 202'.

The NLOS bias has similar impact on the overall estimate of distance difference as described above. The NLOS bias can be corrected similarly, provided the bias is measured. The anchors 201', 202' can perform the bias measurements prior to the UL-TDOA operation, for example during the initialization of the system. Alternatively, the anchors 201', 202' can perform the bias measurements by transmitting an additional packet from anchor B 202' back to anchor A 201' at any time.

If the true fly-time between anchors is known, the NLOS bias can be compensated for. To compensate for the NLOS bias, equation (5) can be rewritten as $$\Delta R^C_{AB} = R_{BM} - R_{AM} = \Delta t * c + (R_{AB} + \Delta R_{AB}) \quad (6)$$

or $$\Delta R^C_{AB} = R_{BM} - R_{AM} = (\Delta t + \Delta t^A/2) * c \quad (7)$$

Figure 6:
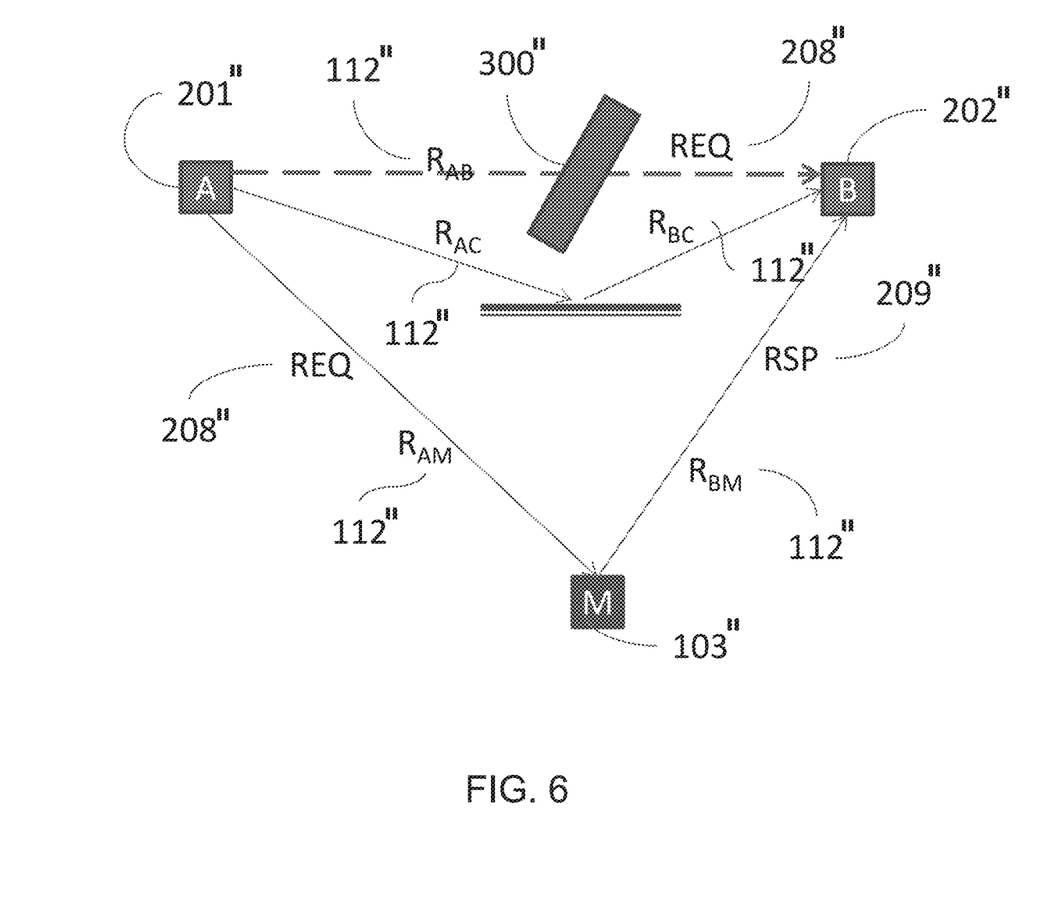
FIG. 6 is a schematic of a bias compensation for network based on beacon synchronized TDOA scheme.

In a further alternative system, the above described bias compensation can be applied to BS-TDOA scheme. Except as described below, or as will be readily appreciated by one having ordinary skill in the art, the anchors 201", 202', the mobile device 103", and the physical obstacle 300" are substantially similar to the anchors 201, 202, mobile device 103, and the physical obstacle 300 described above. A detailed description of the structure and function thereof is thus omitted here for the sake of brevity. In a BS-TDOA scheme, as shown in FIG. 6, a first anchor, or beacon, A 201" can transmit a REQ packet 208". The mobile device 103" can receive the REQ packet 208" and in response can transmit a RSP packet 209". Other anchors within range, e.g. anchor B 202", can receive both the REQ packet 208" from anchor A 201", and the RSP packet 209" from the mobile device 103". FIG. 6 illustrates one example that includes only one additional anchor B 202". The locations of both anchors 201", 202" is known, therefore anchor B 202" can estimate the distance difference between the direct path (A→B) and the indirect path (A→M→B) based on the time difference of arrival measured at anchor B 202" as $\Delta t$, $$\Delta t^* c = R_{BM} + R_{AM} - R_{AB} \quad (8)$$

or $$R_{BM} + R_{AM} = \Delta t^* c + R_{AB} \quad (9)$$

If the path between the anchor A 201″ and the anchor B 202″ is non-line-of-sight, (NLOS), a bias $\Delta R_{AB}$ is present in the total distance traveled by the signal. This bias is present in the measurement of time of flight.

The correction of the NLOS bias can be applied as $$R_{BM} + R_{AM} = \Delta t^* c + (R_{AB} + \Delta R_{AB}) \quad (10)$$

or $$R_{BM} + R_{AM} = \Delta t + \Delta t^4/2)^* c \quad (11)$$

Again, the distance, or time, bias between two anchors in systems where no line of sight exists between nodes can be estimated offline prior to the BS-TDOA transmissions, or during the BS-TDOA operation by letting the second anchor B 202″ transmitting an additional packet. Anchor A 201″ can then receive this additional packet, that itself transmitted, and then estimates the round trip delay bias.

The systems and methods described herein can effectively compensate the bias in the time of flight estimation in NLOS channels between anchors. With the calculated bias, the estimated time of flight can be significantly reduced and subsequently, the position estimate based on the time-of-flight or time-difference-of-arrival is more accurate. Using this technology, anchors in a real time location system can be used in buildings or locations where non-line-of-sight conditions exist while maintaining high accuracy of position estimates of mobile devices based on TDOA schemes.

Although systems and methods have been described by way of examples of preferred embodiments, it is to be understood that various adaptations and modifications may be made within the spirit of the scope of the concepts described herein.

The invention claimed is:

1. A method for compensating for non-line-of-sight ("NLOS") bias in time difference of arrival ("TDOA") estimate between a first anchor and a second anchor in a network having an obstacle in the line-of-sight therebetween, the method comprising:
   transmitting a first packet (REQ packet) from a first anchor;
   indirectly receiving the first packet by a second anchor, then transmitting a second packet (RSP packet) by the second anchor;
   indirectly receiving the second packet by the first anchor;
   receiving the first packet and the second packet by a mobile node;
   estimating the true fly-time of the first or second packets between the first anchor and the second anchor;
   estimating the NLOS bias in time of flight of the first or second packets or any other packet between the first anchor and the second anchor;
   estimating the time difference of arrival at the mobile device between a direct path and an indirect path;
   using the estimated NLOS bias to correct the time difference of arrival estimated at the mobile device.

2. The method of claim 1, wherein the estimating and correcting is performed by the first and second anchors.

3. The method of claim 1, wherein the estimating of fly-time is performed by the first anchor.

4. The method of claim 1, wherein correcting the NLOS bias in the time difference of arrival is performed by the mobile device.

5. The method of claim 1, wherein the estimated bias is filtered.

6. The method of claim 1, wherein the true locations of the first anchor and the second anchor are known.

7. The method of claim 1, wherein the estimated bias is embedded in a packet and transmitted.

8. The method of claim 1, wherein the bias between the first and second anchors is compensated, according to:

$$\Delta R_{AB} = t_{AB}^* c - R_{AB} = \Delta t^4/2^* c - R_{AB},$$

where $t_{AB}$ is the time of travel of the first packet from the first anchor to the second anchor, and
wherein $R_{AB}$ is the direct path between the first and second anchors.

9. The method of claim 1, wherein the estimated bias between anchors is used directly in estimating a corrected distance difference, according to:

$$\Delta R^C_{AB} = \Delta R^M_{AB} - \Delta R_{AB}$$

wherein $\Delta R^M_{AB}$ is the original distance difference measured at the mobile device.

10. The method of claim 1, wherein the true fly-time between the first and second anchor is embedded in a first packet and transmitted.

11. The method of claim 1, wherein the true locations of one or both of the first and second anchors are unknown.

12. The method of claim 1, wherein the NLOS bias between the first and second anchors is estimated and updated a plurality of times.

13. The method of claim 1, wherein the NLOS bias between the first and second anchors is estimated during the initial setup of the network.

14. The method of claim 1 further comprising,
   estimating the position of the mobile device in an external computing device.

15. A method to compensate for non-line-of-sight ("NLOS") bias in a time difference of arrival estimate, using an uplink time difference of arrival ("UL-TDOA") scheme, the method comprising:
   transmitting a first packet (REQ packet) by a mobile device;
   receiving the first packet by at least one first anchor and then transmitting a second packet (RSP packet) by the at least one first anchor;
   receiving the first packet and the second packet by at least one second anchor in range of the mobile device and at least one first anchor;
   estimating an NLOS bias in time of flight of any packet between the at least one first anchor and the at least one second anchor;
   estimating the time differences of arrival at the at least one second anchor; and
   using the estimated NLOS bias to correct the time differences of arrival at the at least one second anchor.

16. The method of claim 15 further comprising,
   estimating the position of the mobile device using the corrected time differences of arrival.

17. The method of claim 16, wherein estimating the position of the mobile device is done in an external computing device.

18. A method to compensate for the non-line-of-sight ("NLOS") bias in a beacon synchronized time difference of arrival ("BS-TDOA") estimate, the method comprising:
   transmitting a first packet (REQ packet) by a first anchor;

receiving the first packet by a mobile node and then transmitting a second packet (RSP packet) by the mobile node;

receiving the first packet and the second packet by at least one second anchor that is within range of the first anchor and the mobile node; and measuring the time differences of arrival between a direct packet transmission path and an indirect packet transmission path by the at least one second anchor;

estimating an NLOS bias in time of flight of any packet between the first anchor and the at least one second anchor;

correcting the time differences of arrival with the estimated NLOS bias of fly-time between the first anchor and at least one second anchor.

* * * * *